Feb. 22, 1949.  E. M. CHRISTENSEN  2,462,362
COMPARTMENTED CULINARY UTENSIL
Filed Dec. 4, 1945
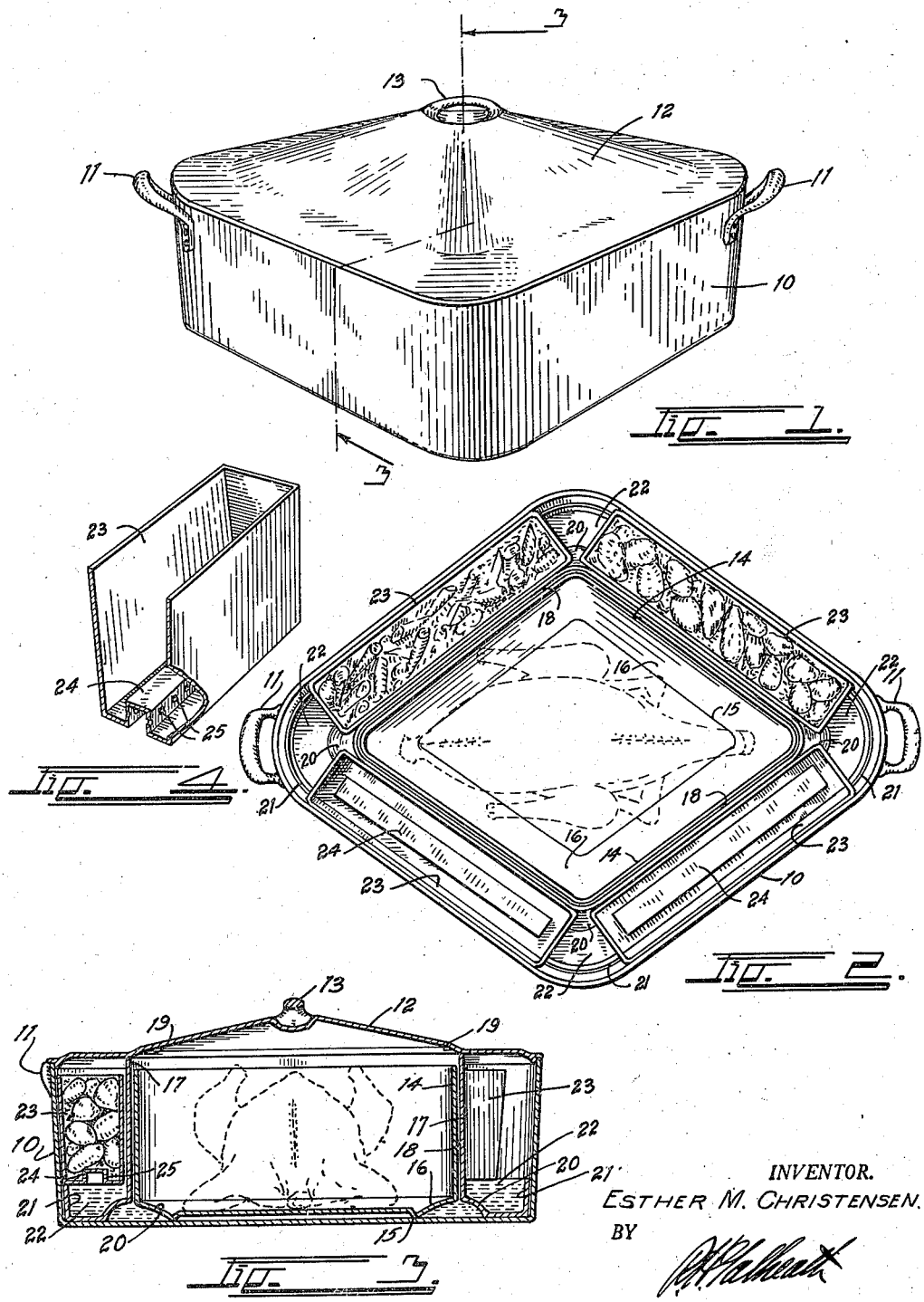
INVENTOR.
ESTHER M. CHRISTENSEN.
BY
ATTORNEY.

Patented Feb. 22, 1949

2,462,362

UNITED STATES PATENT OFFICE 2,462,362

COMPARTMENTED CULINARY UTENSIL

Esther M. Christensen, Denver, Colo.

Application December 4, 1945, Serial No. 632,660

6 Claims. (Cl. 126—377)

This invention relates to a cooking utensil, and more particularly to a utensil which will combine a meat roaster and steamer with a vegetable steamer.

The principal object of the invention is to provide automatic steaming means for the roasting compartment of the utensil whereby the roast will be constantly bathed in hot vapor and steam so as to obtain even roasting without burning or scorching, and without drying or toughening the meat.

Another object of the invention is to provide, in a single utensil, removable compartments whereby the entire main course of a complete meal may be cooked simultaneously.

A still further object is to provide efficient means for steaming vegetables and the like, which will thoroughly cook the same with hot steam without boiling away the nutritious juices therefrom.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved combined meat roaster and vegetable steamer as it would appear with the lid in place thereon;

Fig. 2 is a plan view thereof with the lid removed;

Fig. 3 is a cross-section, taken on the line 3—3, Fig. 1; and

Fig. 4 is a detail, broken-away view, illustrating the construction of one of the vegetable compartments employed in the improved meat and vegetable roaster.

The invention comprises an outer pan 10 provided with suitable carrying handles 11. The outer pan 10 is preferably diamond-shaped, that is, it has four flat sides connected by four rounded corners, and is of greater diagonal length in one direction than in the other. The pan 10 may be covered by means of a similiarly shaped lid 12 provided with a suitable lifting handle 13.

A smaller, similarly shaped roasting pan 14 is placed within the pan 10 so as to leave a relatively wide space between the sides of the two pans. The bottom of the roasting pan is indented downwardly, as shown at 15, so as to support it above the bottom of the outer pan 10. The supporting indentation 15 is elongated and positioned parallel to the walls of the pan 14. The bordering portion of the bottom of the pan 14 between the indentation 15 and the pan wall is arched upwardly, as shown at 16, entirely around the pan.

The pan 14 is maintained in a medial position in the pan 10 by means of an open, diamond-shaped sleeve 17 which surrounds the entire pan 14 closely adjacent to but not in contact with the walls thereof. This construction leaves a riser space 18 entirely around the pan 14. The sleeve 17 extends upwardly above the pan 14 into contact with the lid 12 so as to seal the pan 14.

Along the line where the lid 12 contacts the sleeve 17, the former is arched upwardly and inwardly, as shown at 19. The lower portion of the sleeve 17, entirely around the pan, extends outwardly to form a sub-bottom. The sub-bottom of the sleeve is arched outwardly and downwardly, as shown at 20, to a contact with the bottom of the pan 10, thence extends outwardly and upwardly, forming a peripheral flange 21 extending entirely around the interior of the pan 10. This provides a continuous water pan 22 entirely around the sleeve 17.

A plurality of elongated, removable vegetable compartments 23 are provided. The compartments 23 are of a width to fit snugly between the sleeve 17 and the wall of the pan 10. The bottom of each vegetable compartment is indented upwardly to form a longitudinally extending ridge 24. The ridges 24 are perforated along their sides, as shown at 25.

In use, the pans 10 and 22 are partially filled with water, the meat to be cooked is placed in the pan 14, and the vegetables are placed in the vegetable compartments 23. The lid 12 is then put in position and the entire utensil is placed in or on the cooking stove.

The heat, of course, cooks the meat and the vegetables. It also brings the water in the pans 10 and 22 quickly to the boiling point. The steam from the boiling water in the pan 22 is driven through the perforations 25 into the vegetables. The steam from the boiling water in the pan 10 is driven upwardly in the riser space 18 against the curved portion 19 of the lid 12, which directs it inwardly and downwardly onto the roast from all sides, keeping it moist and tender.

The vegetable compartments are supported above the water in the compartment 22 by means of the peripheral flange 21 so that the vegetables are not immersed in the water but are subjected to the hot steam therefrom.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A culinary utensil for cooking meat and vegetables, comprising: an outer pan; an inner pan of smaller size fitted within the outer pan; a vertical sleeve surrounding and slidably contacting the inner pan; a sub-bottom resting on the bottom of said outer pan and extending outwardly from the lower portion of said sleeve to the walls of the outer pan, thence extending upwardly around said latter walls to form a peripheral water chamber; and removable compartments positioned between the wall of said outer pan and said sleeve and resting upon the upwardly extending periphery of said sub-bottom so as to be supported above said sub-bottom.

2. A culinary utensil for cooking meat and vegetables, comprising: an outer pan; an inner pan of smaller size fitted within the outer pan; a vertical sleeve surrounding and slidably contacting the inner pan; a sub-bottom extending outwardly from the lower portion of said sleeve to the walls of the outer pan, thence extending upwardly around said latter walls to form a peripheral water chamber; removable compartments positioned between the wall of said outer pan and said sleeve; and a lid contacting the wall of the outer pan and enclosing the inner pan and the compartments, said lid resting on the upper edge of said sleeve so as to seal the inner pan from the compartments.

3. A culinary utensil for cooking meat and vegetables, comprising: an outer pan; an inner pan of smaller size fitted within the outer pan; a vertical sleeve surrounding and slidably contacting the inner pan; a sub-bottom resting on the bottom of said outer pan and extending outwardly from the lower portion of said sleeve to the walls of the outer pan, thence extending upwardly to form a rim along said latter walls to form a peripheral water chamber, said upwardly extending rim terminating below the top of said outer pan; and removable compartments positioned between the wall of said outer pan and said sleeve supported by said rim above said sub-bottom, the peripheral portion of the bottom of the inner pan being arched upwardly and outwardly forming a water compartment in combination with the bottom of the outer pan below and around the inner pan.

4. A culinary utensil for cooking meat and vegetables, comprising: an outer pan; an inner pan of smaller size fitted within the outer pan; a vertical sleeve surrounding and slidably contacting the inner pan; a sub-bottom extending outwardly from the lower portion of said sleeve to the walls of the outer pan, thence extending upwardly around said latter walls to form a peripheral water chamber; and removable compartments positioned between the wall of said outer pan and said sleeve, the peripheral edge of the bottom of the inner pan being arched upwardly and outwardly, the adjacent portion of the sub-bottom being arched outwardly and downwardly these arched portions of the inner pan and the adjacent sub-bottom of the sleeve forming a water compartment in combination with the bottom wall of the outer pan, said sleeve being spaced from the walls of the inner pan sufficiently to allow steam to rise upwardly therebetween.

5. A culinary utensil for cooking meat and vegetables, comprising: an outer pan; an inner pan of smaller size fitted within the outer pan; a vertical sleeve surrounding and slidably contacting the inner pan; a sub-bottom extending outwardly from the lower portion of said sleeve to the walls of the outer pan, thence extending upwardly around said latter walls to form a peripheral water chamber; removable compartments positioned between the wall of said outer pan and said sleeve, the peripheral edge of the bottom of the inner pan being arched upwardly and outwardly, the adjacent portion of the sub-bottom being arched outwardly and downwardly these arched portions of the inner pan and the adjacent sub-bottom of the sleeve forming a water compartment in combination with the bottom wall of the outer pan, said sleeve being spaced from the walls of the inner pan sufficiently to allow steam to rise upwardly therebetween; and means adjacent the upper portion of said sleeve for directing the rising steam inwardly toward the inner pan.

6. A culinary utensil for cooking meat and vegetables, comprising: an outer pan; an inner pan of smaller size fitted within the outer pan; a vertical sleeve surrounding and slidably contacting the inner pan; a sub-bottom extending outwardly from the lower portion of said sleeve to the walls of the outer pan, thence extending upwardly around said latter walls to form a peripheral water chamber; removable compartments positioned between the wall of said outer pan and said sleeve, the peripheral edge of the bottom of the inner pan being arched upwardly and outwardly, the adjacent portion of the sub-bottom being arched outwardly and downwardly these arched portions of the inner pan and the adjacent sub-bottom of the sleeve forming a water compartment in combination with the bottom wall of the outer pan, said sleeve being spaced from the walls of the inner pan sufficiently to allow steam to rise upwardly therebetween; means adjacent the upper portion of said sleeve for directing the rising steam inwardly toward the inner pan; and means for supporting the medial portion of the bottom of the inner pan out of contact with the bottom of the outer pan.

ESTHER M. CHRISTENSEN.

REFERENCES CITED

The following references are of record in the file of this patent:

UNITED STATES PATENTS

| Number | Name | Date |
| --- | --- | --- |
| 1,746,261 | Keplinger | Feb. 11, 1930 |
| 1,929,682 | Ellinger | Oct. 10, 1933 |

FOREIGN PATENTS

| Number | Country | Date |
| --- | --- | --- |
| 215,702 | Great Britain | May 15, 1924 |